Jan. 1, 1957  H. W. LEIBENSBERGER  2,775,995
FILM SPLICER AND MARKER
Filed Dec. 30, 1954
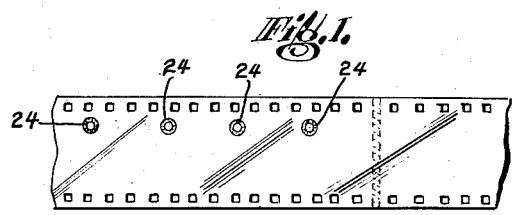
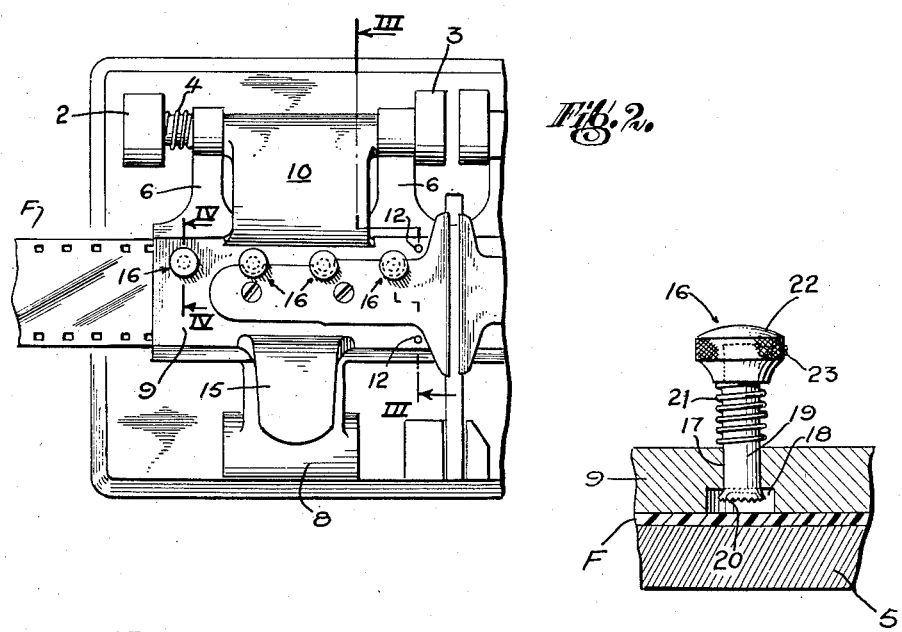
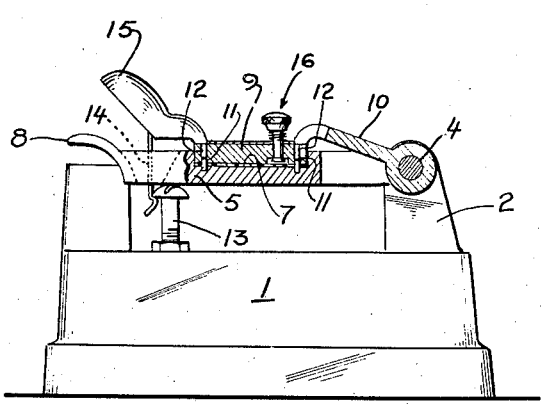
INVENTOR
Harry W. Leibensberger
BY
Brown + Seward
ATTORNEYS

20

United States Patent Office 2,775,995
Patented Jan. 1, 1957

2,775,995

FILM SPLICER AND MARKER

Harry W. Leibensberger, Port Jefferson, N. Y.

Application December 30, 1954, Serial No. 478,853

7 Claims. (Cl. 154—42.1)

This invention relates to an improvement in film splicers and markers, with particular reference to the type of film splicer shown, for instance, in Griswold Patent No. 1,596,966 of August 24, 1926, wherein sections of motion picture film to be connected may have their ends prepared for splicing, and spliced, without requiring endwise shifting or handling of any other sort.

The projector operator always has readily avaliable for instant use a film splicer, usually of the general type just referred to, and is prepared to mend film breaks as promptly as possible when they occur. As a further, and basic, aid in ensuring that the cinematic presentation is continuous and uninterrupted, it is customary to provide two projectors, the mechanism of the second one being started at a predetermined interval of time, distance or frames before the first one reaches the end of its film. The operator is able to do this because of the provision of small, but clearly visible, "cue marks" on the first film at some known arbitrary distance from its end. A common practice is to provide a first set of marks approximately 160 frames from the end of the film and a second set about fourteen frames from the end, the mechanism of the second machine being started upon the appearance of the first marks and the projection of sound and light being cut over to the second machine upon the appearance of the second set of marks.

While cue marks may be applied to the film when it is printed, such original marks are frequently of such a shade or nature as to be practically invisible, and it is also common for them to be removed entirely, or at least to have their position in relation to the end of the film so changed as to render them useless, due to breakage or cutting of the film near its end.

It is an object of the present invention to provide means, built into the film splicer, for applying to selected portions of the film clear and distinct cue marks.

It is a further object to provide such means in a conveniently usable location without interference in the normal operation of the film splicer.

A practical embodiment of the invention is shown in the accompanying drawing, in which:

Fig. 1 represents a plan view of a section of film, including a splice and four cue marks;

Fig. 2 represents a plan view of the left-hand half of a typical film splicer, with cue markers; the right-hand half being broken away;

Fig. 3 represents a vertical section on the line III—III of Fig. 2, looking in the direction of the arrows; and Fig. 4 represents an enlarged detail vertical section, taken on the line IV—IV of Fig. 2, showing the construction and arrangement of a single cue marker.

Referring to the drawings, the film splicer comprises a base 1, from the top of which rise the lugs 2, 3 forming the supports for a fixed shaft 4 on which the left film clamp is pivotally mounted. The clamp includes a lower jaw 5, journalled on the shaft 4 by means of the arms 6, 6 and provided with a film-receiving channel 7 and a handle 8, said lowre jaw cooperating with an upper jaw 9 which is journalled on the shaft 4 through a single wide arm 10. The main body of the upper jaw is in the form of a flat plate adapted to fit freely in the channel 7, with a calculated clearance between the flat bottom of the channel and flat bottom of the upper jaw equal approximately to the thickness of the film F. Near the right (cutting and splicing) end of the clamp the lower jaw is provided with film registering pins 11, 11, opposite which the upper jaw is relieved by the provision of holes 12, 12.

The clamp is supported in horizontal position by means of the adjustable stop 13, the head of which may be engaged by the spring catch 14 projecting downwardly from the handle 15 of the upper jaw 9 and through the handle 8 of the lower jaw.

Spaced at regular intervals (equal to the frame length) along the upper jaw 9, there are provided a plurality of cue marking devices 16, four being shown herein. To receive these devices the jaw plate is drilled to make holes 17, each of which is counter-sunk around its lower end as shown at 18. Each cue marker comprises a vertical shaft 19 upset slightly and knurled around its bottom edge 20 to form an annular scratching portion, the shaft passing freely through the hole 17 and having its upper portion surrounded by a spring 21 between the jaw 9 and an operating button or finger grip 22. The button or grip may be secured on the shaft end by means of a small set screw 23 or these parts may be threaded and screwed tightly together.

In operation, the projectionist or other operator opens the film clamp by swinging upwardly the upper jaw of the left clamp, the entire right clamp being swung up out of the way (unless the cue marks are to be applied adjacent a freshly made splice as in Fig. 1). The film is placed in the channel 7 of the lower jaw, with the proper perforations engaging the registering pins 11, 11 and the selected four frames located opposite the cue markers, i. e., to the left of said pins. The upper jaw is then closed down on the film (Fig. 3) and the operator depresses and rotates each of the cue marking devices 16 to scratch a small but clearly noticeable ring 24 in the emulsion face of the film (Fig. 1). Since the film is always placed emulsion side up in this type of splicer, there is little chance that the operator might make a mistake in placement of the cue marks.

The end of a film is a part which is particularly subject to damage, so as to require cutting, splicing and, necessarily, relocation of the cue marks. It is thus a great convenience for the operator to be able to splice and accurately mark the film in a single small machine, particularly when these operations have to be performed in the cramped confines of a projection booth and as quickly as possible.

What I claim is:

1. A film splicer and marker comprising, a base, a film clamp mounted thereon and having film registering means and a portion adapted to overlie a film, and cue marking devices mounted in said overlying portion longitudinally of the film and having a predetermined spatial relation to said film registering means.

2. A film splicer and marker according to claim 1 in which the cue marking devices are in the form of a plurality of rotatable plungers having film-scratching portions.

3. A film splicer and marker according to claim 2, which includes springs for holding the film-scratching portions normally out of contact with the film and finger grips for use in depressing and rotating the plungers.

4. A film splicer and marker comprising, a base, a lower film clamp jaw mounted on said base and provided with a film-receiving channel and film registering means in said channel, an upper film clamp jaw pivotally mounted on said base for motion toward and away from said lower jaw, the upper jaw including a flat plate portion adapted to cooperate with said channel to hold a film therein, and cue marking devices mounted in said plate longitudinally of the film and having a predetermined spatial relation to said film registering means.

5. A film splicer and marker according to claim 4 in which the cue marking devices are in the form of a plurality of rotatable plungers having film-scratching portions.

6. A film splicer and marker according to claim 5 which includes springs for holding the film-scratching portions normally out of contact with the films and finger grips for use in depressing and rotating the plungers.

7. In a film splicer and marker, a plate forming part of a splicer and adapted to be brought adjacent the upper surface of a film to be marked, said plate being traversed by a vertical hole countersunk around its lower end, and a cue marker comprising, a shaft movable through said hole and provided with an enlarged knurled lower end adapted to be housed in the countersunk part of the hole, a finger grip on the upper end of said shaft for depressing and rotating it and a spring associated with said shaft and grip and tending to hold the shaft normally in such position that its lower end is housed in the countersunk part of the hole.

References Cited in the file of this patent
UNITED STATES PATENTS

| | | |
|---|---|---|
| 1,471,864 | Sentou et al. | Oct. 23, 1923 |
| 2,611,723 | Aboltin | Sept. 23, 1952 |
| 2,611,724 | Wittenberg | Sept. 23, 1952 |
| 2,677,409 | Jirouch | May 4, 1954 |